(12) United States Patent
Nikonov

(10) Patent No.: US 6,873,763 B2
(45) Date of Patent: Mar. 29, 2005

(54) MANAGING CHANNELS WITH DIFFERENT WAVELENGTHS IN OPTICAL NETWORKS

(75) Inventor: Dmitri E. Nikonov, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 82 days.

(21) Appl. No.: 10/121,346

(22) Filed: Apr. 12, 2002

(65) Prior Publication Data

US 2003/0194180 A1 Oct. 16, 2003

(51) Int. Cl.[7] ............................................... G02B 6/34
(52) U.S. Cl. ...................................................... 385/37
(58) Field of Search ............................. 385/24, 37, 46, 385/15; 398/79, 84, 87; 359/117; 395/79

(56) References Cited

U.S. PATENT DOCUMENTS

| | | | | |
|---|---|---|---|---|
| 4,443,700 A | * | 4/1984 | Macedo et al. | 250/227.16 |
| 5,574,584 A | * | 11/1996 | Darcie et al. | 398/72 |
| 5,657,144 A | * | 8/1997 | Tanaka et al. | 398/48 |
| 5,748,811 A | * | 5/1998 | Amersfoort et al. | 385/15 |
| 5,754,320 A | * | 5/1998 | Watanabe et al. | 398/50 |
| 6,014,237 A | * | 1/2000 | Abeles et al. | 398/87 |
| 6,034,799 A | * | 3/2000 | Hansen | 398/1 |
| 6,240,118 B1 | * | 5/2001 | Doerr et al. | 372/64 |
| 6,298,177 B1 | * | 10/2001 | House | 385/3 |
| 6,377,730 B1 | * | 4/2002 | Bergmann et al. | 385/39 |
| 6,762,876 B2 | * | 7/2004 | Tilleman et al. | 359/330 |
| 6,771,409 B2 | * | 8/2004 | Huang | 359/238 |

OTHER PUBLICATIONS

Yairi et al., "Optically Controlled Optical Gate With an Optoelectronic Dual Diode Structure—Theory and Experiment", Optical and Quamtum Electronics, Special Issue on Components for Ultrafast Communications, vol. 33, 1035–1054, Sep. 2001.

* cited by examiner

Primary Examiner—Joseph Williams
Assistant Examiner—Dalei Dong
(74) Attorney, Agent, or Firm—Trop, Pruner & Hu, P.C.

(57) ABSTRACT

An arrayed waveguide grating may include a plurality of waveguides, each associated with a different channel in a wavelength division multiplexed system. Each incoming signal channel in a node of a wavelength division multiplexed network may be of an arbitrary wavelength and is provided to one of the wavelength converters attached on the arrayed waveguide grating. Each converter also receives one of blank light channels of different wavelengths on a grid. The converters convert each of the incoming wavelength signals to one of the distinct new wavelength signals on the grid of wavelengths, and these new wavelength signals are multiplexed into a fiber.

9 Claims, 2 Drawing Sheets

MANAGING CHANNELS WITH DIFFERENT WAVELENGTHS IN OPTICAL NETWORKS

BACKGROUND

This invention relates generally to optical networks and, particularly, to wavelength division multiplexed networks.

In wavelength division multiplexed (WDM) optical networks, several signals are transmitted at different wavelengths over a single fiber. In a variety of circumstances, various wavelengths may be added to an existing network along the way or removed from the network along the way. As a result, conflicts may arise where several channels of the same wavelength are delivered to the same network node and must be sent along the same fiber.

To overcome these conflicts, one signal of the duplicate wavelengths needs to be converted to a different wavelength. Existing wavelength converters operate as standalone devices, converting a signal from one incoming channel to a signal of a different wavelength in one outgoing channel. An intricate management of the network is needed to multiplex the signals and to avoid channel conflicts in subsequent nodes.

Thus, there is a need for better ways to handle the issue of wavelength conflicts in optical networks.

DETAILED DESCRIPTION

Figure 1:
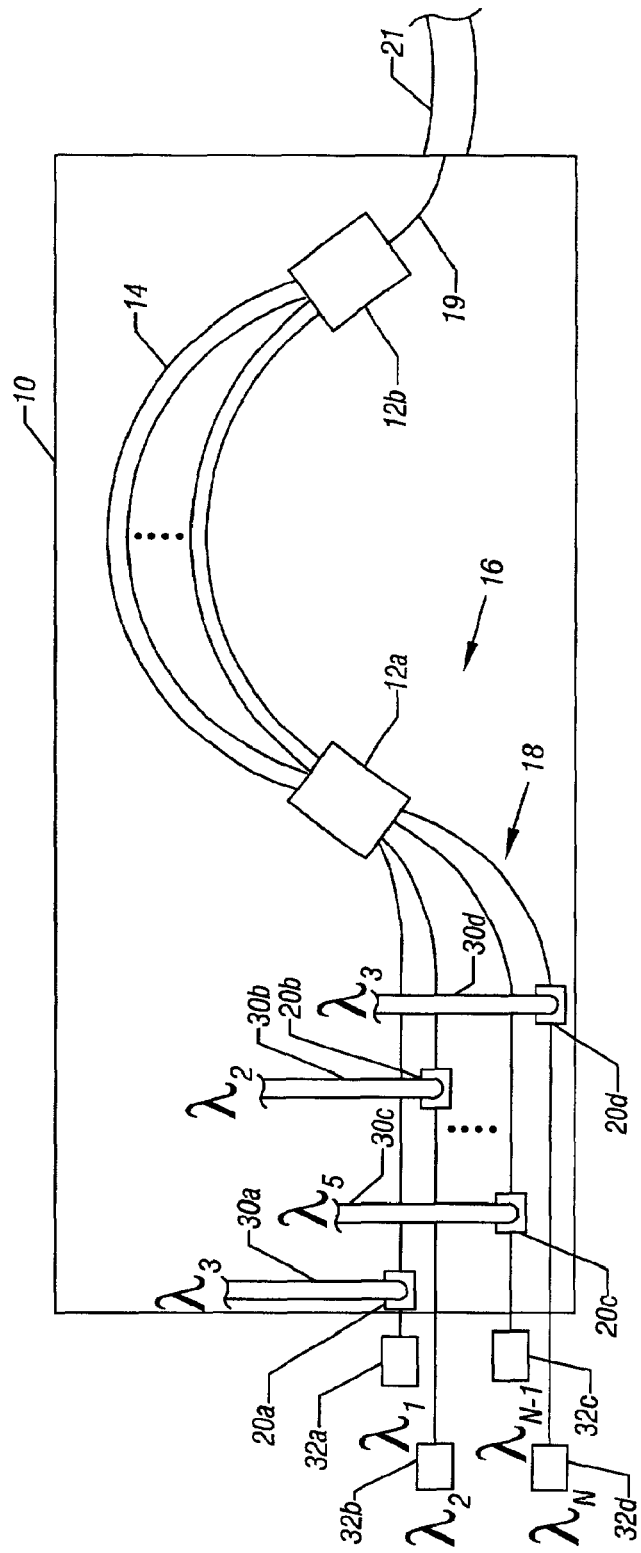
FIG. 1 is a schematic depiction of one embodiment of the present invention.

An arrayed waveguide grating (AWG) 10, sometimes also called a waveguide grating router (WGR) or a phasar, may be formed as an integrated optical circuit. The AWG 10 may include a plurality of input waveguides 18 that leads to a star coupler 12a, an array of waveguides 14 between the star coupler 12a and the star coupler 12b, and an output waveguide 19 coupled to the coupler 12b. The length of each arrayed waveguide 14 in the array of waveguides 14 may be distinguished from its adjacent waveguide by a length difference ($\Delta L$).

A channel of certain wavelength enters the AWG in one of the input waveguides 18. The input coupler 12a splits the light in the channel among the arrayed waveguides 14. Each portion of the input light traveling through an arrayed waveguide 14 includes any wavelength that has entered the AWG 10 in any of the input channels 18. Each wavelength then acquires an individual phase shift. In addition, each wavelength for each channel receives phase shifts in the input and output star couplers 12. Therefore, each portion of light of a given wavelength requires different phase shifts, and all these portions interfere at the output coupler 12b. That leads to the property of an AWG that the light channel focuses on one of the output waveguides 19 depending on the position of an input waveguide 18 and the wavelength of the channel. In order to multiplex the light channels from input waveguides 18a, . . . 18d into the same output waveguide 19, these channels must be set on a wavelength grid $\lambda_1, \ldots \lambda_N$. This grid is usually such that the frequency difference between adjacent channels $\lambda_n$ and $\lambda_{n+1}$ is constant.

In an arbitrary situation in a WDM network, the input channels do not satisfy this condition. Some of the input channels occupy the same wavelength. Besides this situation changes dynamically as traffic patterns in the network changes.

In the embodiment shown in FIG. 1, each of a plurality of lasers 32, such as a continuous wave laser, generates one of N signals that are placed into the input waveguide 18. Each laser 32 generates a constant intensity light of a single wavelength from $\lambda_1$ through $\lambda_N$. Each channel includes a wavelength converter 20. Thus, the laser 32a, at wavelength $\lambda_1$, generates a light signal that enters a wavelength converter 20a. The resulting output signal is passed to the coupler 12a.

Each converter 20 converts the input light signal, that comes in at some wavelength from a fiber 30a, to a different wavelength. In accordance with one embodiment of the present invention, a regular grid of wavelengths with regular spacing there between is defined by the array of lasers 32. The incoming wavelengths on the incoming channels indicated by the fibers 30 are then converted to the appropriate grid of wavelengths. In particular, the signal that comes in on each input fiber 30 is modulated so as to carry the same information, but using a light signal having a different wavelength.

Again, referring to the example shown in FIG. 1, a laser 32a produces light of a wavelength $\lambda_1$. The input signal from another optical component comes in over the fiber 30a at a wavelength $\lambda_3$. The output signal from the converter 20a carries the information that came in on the fiber 30a, but provides it using the wavelength $\lambda_1$ supplied by the laser 32a. The wavelength $\lambda_1$ is then provided to an optical fiber coupled to the output waveguide 19a.

The same operation occurs in each of the other channels. Thus, for example, if the input signal has a potential wavelength conflict, for example, because the input signal on the fibers 30a and 30d are at the same wavelength ($\lambda_3$), the resulting converted signals all have different wavelengths. For example, the wavelength that came in on the fiber 30a is converted to the wavelength $\lambda_1$ and the signal that came in on the fiber 30d is converted to a wavelength $\lambda_N$.

As a result, a regular grid of distinct wavelength channels is generated for all the incoming signals, regardless of their original wavelength. The resulting output signal coming out of the output waveguide 19 has the regular grid of distinct wavelengths preordained by the array of lasers 32. Outgoing wavelength channels are then directed into a single fiber connected to the AWG 10. This avoids the possibility of wavelength conflict.

In accordance with one embodiment of the present invention, the converters 20 may each receive a blank optical channel from a different laser 32 in the plane of the integrated circuit forming the AWG 10. The incoming signal from the fiber 30 may be brought vertically into the converter 20.

Figure 2:
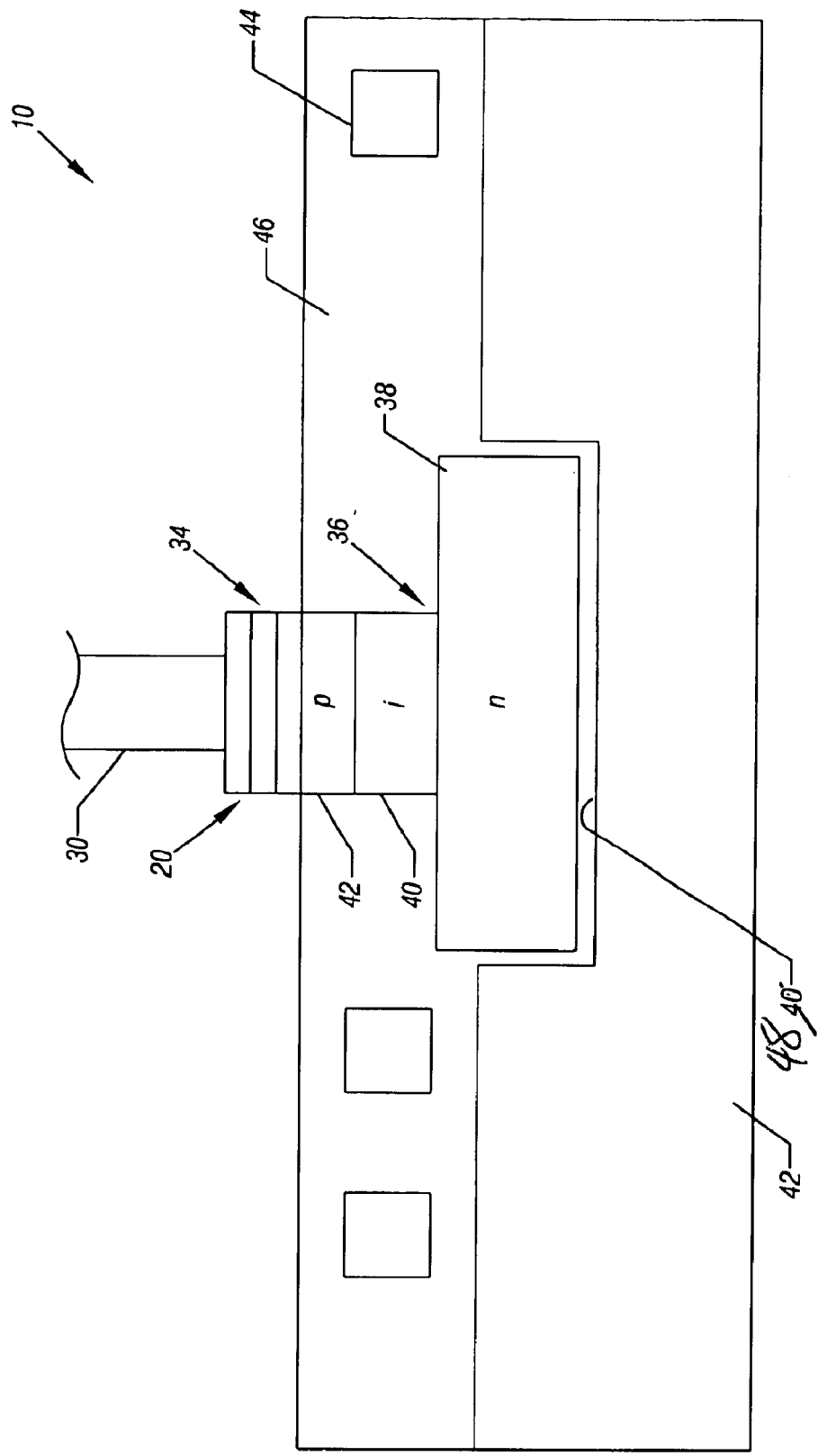
FIG. 2 is a cross-sectional depiction of a wavelength converter which is part of the embodiment shown in FIG. 1 in accordance with one embodiment of the present invention.

In one embodiment, the conversion may occur in a group III–V semiconductor material wavelength converter 20, as shown in FIG. 2. The converter 20 comprises a PIN detector diode 34 on top of a PIN diode modulator 36. The PIN diode modulator 36 includes a p-type region 42, an intrinsic region 40, and an n-type region 38. The AWG 10 may include an upper silica layer 46 over a substrate 42 that may be silicon in one embodiment. In the upper layer 46, the germanium doped buried-channel silica waveguide 44 are formed. The wavelength converter 20 sits in a trench 48 formed in the substrate 42. The layer of silica waveguide 44 is aligned to the modulator 38.

In one embodiment, the input signal from a fiber 30 is absorbed in the PIN detector 20, thereby creating free carriers and changing the voltage on the modulator 36. The blank light is then modulated due to a change in absorption caused by the voltage change.

In another embodiment, the wavelength conversion may occur due to cross-gain modulation between the two laser beams.

The modulated blank signal is coupled to a silica output waveguide 18 which then passes on to a star coupler 12a as shown in FIG. 1. The waveguides 18 are actually formed in the silica layer 46 (and are positioned in the page in FIG. 2) behind the p-type region 42 and intrinsic region 40 of the PIN diode modulator 36.

In accordance with some embodiments of the present invention, the AWG 10 may be defined by lithographic methods and fabricated of a III-V semiconductor material in a single process to include the waveguides 14, the couplers 12, and the converters 20. As a result, the cost of optical components may be reduced because the cost of optical components is largely driven by fiber interfacing and aligning of the devices and the cost of testing them. Combining multiple devices into a single integrated circuit may significantly decrease cost in some embodiments. Also, the integrated approach may decrease losses of optical power in the network since most of optical losses occur in the interfaces between fibers and integrated circuits.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A device comprising:

an array of waveguides to form an arrayed waveguide grating;

a pair of star couplers coupled to said waveguides;

an input waveguide coupled to one of said couplers;

an output waveguide coupled to the other of said couplers; and a plurality of wavelength converters coupled to each of a plurality of channels in said input waveguide, each of said converters receiving two optical signals, at least one of said converters including a PIN diode detector and a PIN diode modulator.

2. The grating of claim 1 wherein said arrayed waveguide grating and wavelength converters are integrated in the same substrate.

3. The grating of claim 1 wherein said arrayed waveguide grating includes a silicon substrate and wherein said converters are formed in a trench in the silicon substrate.

4. The grating of claim 1 including an array of continuous wave lasers coupled to said grating.

5. The grating of claim 4 wherein each of said lasers produces one wavelength of a grid of distinct wavelengths.

6. An optical network comprising:

a plurality of fibers;

a grid of lasers that produce light of distinct wavelengths;

an arrayed waveguide grating coupled to said fibers and said lasers, said waveguide grating including a pair of couplers coupled to said waveguides;

an input waveguide coupled to one of said couplers;

an output waveguide coupled to the other of said couplers; and a plurality of wavelength converters each coupled to one of said fibers and to said input waveguide, said converter including a PIN diode detector over a PIN diode modulator.

7. The network of claim 6 wherein said arrayed waveguide grating and wavelength converters are integrated in the same substrate.

8. The network of claim 6 wherein said detectors are coupled to said fibers and said modulators are coupled to said lasers.

9. The network of claim 6 including an array of continuous wave lasers coupled to said grating.

* * * * *